United States Patent [19]
Saleh et al.

[11] Patent Number: 5,324,817
[45] Date of Patent: Jun. 28, 1994

[54] PROCESS FOR IMPROVING BIODEGRADABILITY OF PVC

[75] Inventors: Ramzi Y. Saleh, Flemington; Michael Siskin, Morristown; George A. Knudsen, Scotch Plains, all of N.J.

[73] Assignee: Exxon Research and Engineering Company, Florham Park, N.J.

[21] Appl. No.: 63,396

[22] Filed: May 18, 1993

Related U.S. Application Data

[63] Continuation-in-part of Ser. No. 811,419, Dec. 20, 1991, abandoned.

[51] Int. Cl.$^5$ ............................... C08F 6/26
[52] U.S. Cl. ..................... 528/481; 528/499
[58] Field of Search ................. 528/481, 499

[56] References Cited

U.S. PATENT DOCUMENTS

| | | | |
|---|---|---|---|
| 3,021,318 | 10/1957 | Laporta | 260/87.1 |
| 3,083,193 | 12/1958 | Kolner | 260/94.9 |
| 3,826,789 | 7/1974 | Yokokawa | 260/92.8 |
| 4,051,212 | 9/1977 | Grigat et al. | 264/102 |
| 4,136,967 | 1/1979 | Grigat et al. | 366/82 |
| 4,423,193 | 12/1983 | Melby et al. | 528/481 |
| 4,424,340 | 1/1984 | Golstein et al. | 526/345 |

FOREIGN PATENT DOCUMENTS

| | | |
|---|---|---|
| 2072131 | 9/1971 | France . |
| 2369299 | 5/1978 | France . |
| 1554514 | 10/1979 | United Kingdom . |

OTHER PUBLICATIONS

EP Search report dated Jun. 17, 1993 for Application No. 92311507.5 (with enclosures cited above).
Chemical Abstracts, vol. 84, No. 45009k Feb. 23, 1976.

*Primary Examiner*—Joseph L. Schofer
*Assistant Examiner*—Tom Weber
*Attorney, Agent, or Firm*—Linda M. Scuorzo

[57] ABSTRACT

The present invention relates to a process for dehydrochlorinating polyvinylchloride polymers to remove about 30 wt % chlorine therefrom by heating the starting materials PVC and deoxygenated liquid water, preferably neutral liquid water at temperatures from about 200° C. up to the critical temperature of water at autogenous pressure to maintain the water as a liquid phase. The process has utility in recycling by enabling PVC to be dechlorinated specifically by a means that does not release chlorine gas.

8 Claims, No Drawings

PROCESS FOR IMPROVING BIODEGRADABILITY OF PVC

This is a Continuation-in-Part of U.S. Ser. No. 811,419 filed Dec. 20, 1991 now abandoned.

BACKGROUND OF THE INVENTION

1. Field of the Invention

The present invention relates to a conversion process for removing chlorine from polyvinylchloride polymer resins.

2. Discussion of Related Art

PVC resins find widespread use in industrial and construction applications. These polymers are not biodegradable and, thus, form an undesirable component of waste streams. In addition, the chlorine component of PVC forms a toxic, corrosive contaminant in many processes. Hence, it is desirable to have it removed or its effects neutralized so that the PVC may be processed more safely.

SUMMARY OF THE INVENTION

The present invention relates to a process for removing chlorine from ("dehydrochlorinating") Polyvinylchloride polymers ("PVC") using liquid water as the starting materials at conditions effective to cause such removal. As is generally known to those skilled in the art dehydrochlorinating means removing chlorine as hydrogen and chlorine or as hydrogen chloride. The polymers are selected from the group consisting of homopolymers of polyvinylchloride, and copolymers of vinylchloride. The process involves contacting starting materials of a PVC polymer and liquid water at a temperature from about 200° C. up to the critical temperature of water, more preferably from about 200° C. to about 350° C. for from about ½ hour to about 6 hours, at the corresponding autogeneous pressure generated at the particular reaction temperature at autogenous pressure, which typically for liquid water will be from about 225.45 psi at 200° C. to about 2397.9 psi at 350° C. depending on the temperature of the system. Preferably, neutral liquid water can be used as a starting material. However, liquid water of pH$\leq$7 may be used. Applicants' process uses liquid water (i.e., water maintained as a liquid phase at reaction conditions during the process) as an essential element of the process. The process has utility as a means for dehydrochlorinating and, thus, rendering more environmentally benign, a plastic that is currently a major component of the plastics waste stream and not biodegradable.

DETAILED DESCRIPTION OF THE INVENTION

The process of the present invention is used to convert (dehydrochlorinate) polymers of PVC to carbonaceous materials having decreased chlorine content wherein such conversion preferably removes up to about 90 wt % of the chlorine. Such conversion is effected by removal of chlorine from the PVC polymer itself (i.e., at C-Cl bonds of the PVC polymer) rather than by physical removal of occluded monomers (such as vinyl chloride) that may be present in or associated with the PVC polymer. These carbonaceous materials are more easily degradable and compatible with subsequent processing.

The PVC polymers that may be dehydrochlorinated by the process of the present invention are made by suspension polymerization processes, which are well known to one having skill in the art (see Schildknecht, "Vinyl and Related Polymers", John Wiley and Sons, Inc., New York (1952)). They may also be obtained commercially or as a by-product from construction and industrial applications. The PVC may be obtained as finely divided particles. However, waste or scrap PVC is equally usable in the process of the present invention, provided that it is cut or otherwise decreased into pieces of a size that can be accommodated in the reaction vessel. It is preferred that the pieces be of sufficiently small in size to be capable of forming a suspension in the water. Typically the PVC to water ratio is an effective amount from about 10:1 to about 2:1. Preferably deoxygenated, neutral liquid water is used. The PVC polymers may also contain plasticizers which will be hydrolyzed during the process of the present invention.

The starting materials, PVC and liquid water (preferably neutral liquid water, pH=7, although liquid water of pH equal to or less than 7 may be used) are contacted and heated at a temperature from about 200° C. to the critical temperature of water, which is about 374° C., preferably from about 200° C. to about 350° C., more preferably from about 225° C. to about 325° C. The contacting is carried out at autogenous pressure (i.e., the combined vapor pressure that is generated by the mixed components of the system at the particular reaction temperature), which typically, for liquid water alone will be from about 225.45 psi at 200° C. to about 2397.79 psi at 350° C. It is a requirement of this invention that the water be maintained as liquid water under autogenous pressures.

Thus, combinations of process conditions of temperature and volume in the reactor should be selected accordingly to maintain water as a liquid phase. Pressures of liquid water at various temperatures within the above temperature range can readily be determined by one having ordinary skill in the art from standard reference texts. See, e.g., CRC Handbook of Chemistry and Physics, 61st Edition, p. D-197 (1980–1981). The contacting is carried out for a time sufficient and under conditions effective to dehydrochlorinate the PVC; such time is typically from about ½ hour to about 6 hours. The process may be carried out using liquid water or, preferably deoxygenated liquid water, as a starting material. Applicants have found that the use of deoxygenated water can minimize undesirable side reactions. It is recommended that the reaction be carried out in the absence of free radical initiators. Although the process of the present invention may be carried out such that any amount of chlorine up to about 90 wt % of chlorine is removed (typically as HCl), it is generally more desirable to remove greater amounts of chlorine. Thus, typically, dehydrochlorination (i.e. chlorine removal of from about 30 wt % to about 90 wt %, more preferably 50 wt % to about 90 wt %, most preferably, 70 wt % to about 90 wt % from the starting sample of the PVC polymer are preferable to be achieved. The result is thus one or more organic high molecular weight (but lower than that of the starting PVC polymer) compounds containing mainly C, H and 0. These compounds are insoluble, partly insoluble or soluble in the aqueous phase, and thus evidence a dehydrochlorination of the starting of PVC polymer in the amounts previously specified.

In the process of the present invention, chlorine is removed as HCl; that is, HCl is produced as a by-product rather than chlorine gas. It is present in the aqueous phase, while the carbonaceous material, i.e. dehydrochlorinated PVC polymer is largely present as a separate, typically solid phase. The HCl is present in a form that may be neutralized and/or easily separated from the dehydrochlorinated PVC by any conventional method known to one having ordinary skill in the art. The dehydrochlorination process may be operated continuously or in batch. Many PVC polymers contain significant levels of plasticizers that also undergo hydrolysis in hot water to carboxylic acids and alcohols which also may be separated, recycled or used as desired.

The process of the present invention produces dehydrochlorinated hydrocarbon materials that are useful as a feedstock for generation of lighter hydrocarbons, particularly because much of the chlorine has been removed.

The invention may suitably comprise, consist or consist essentially of the elements described herein.

The invention will be further understood, but not limited by, reference to the following examples.

Example 1

A 0.5 g sample of polyvinylchloride powder and 5 g of deoxygenated neutral liquid water as starting materials were heated in a sealed mini reactor (11 ml volume) at 315° C. for 1 hour. At the end of the experiment, the reaction vessel contained an aqueous layer of HCl and a fluffy, porous, black residue that contained 38.5 wt % C, 7.4 wt % H, 5.7 wt % Cl, and 48.4 wt % oxygen (by difference) indicating that 90 wt % of the chlorine was removed from the PVC.

Example 2

The process of Example 1 was repeated at 250° C. for 2 hours yielding a product that contained 79.9 wt % C, 7.34 wt % H, 8.07 wt % Cl, and 4.7 wt % oxygen (by difference) indicating that 86% of chlorine was removed.

What is claimed is:

1. A process for removing the chlorine from a PVC polymer, comprising: contacting the PVC polymer and an effective amount of deoxygenated liquid water at a temperature of from about 200.C up to the critical temperature of water at autogenous pressure sufficient to maintain water as a liquid for a time sufficient to dehydrochlorinate from about 30 wt % to about 90 wt % of chlorine from the PVC polymer.

2. The process of claim wherein the liquid water is neutral liquid water.

3. The process of claim 1 wherein the liquid water has a pH of up to 7.

4. The process of claim 1 wherein the contacting is at a temperature from about 200° C. to about 350° C.

5. The process of claim 1 wherein the contacting is at a temperature from about 225° C. to about 325° C.

6. The process of claim 1 wherein the contacting is carried out for a time from about ½ hour to about 6 hours.

7. The process of claim 1 wherein from about 70 wt % to about wt % of chlorine from PVC.

8. The process of claim 1 wherein the chlorine is removed as HCl.

* * * * *